(12) United States Patent
Park et al.

(10) Patent No.: US 12,464,424 B2
(45) Date of Patent: Nov. 4, 2025

(54) METHOD AND APPARATUS FOR IMPROVING HANDOVER PERFORMANCE IN COMMUNICATION SYSTEM

(71) Applicant: ELECTRONICS AND TELECOMMUNICATIONS RESEARCH INSTITUTE, Daejeon (KR)

(72) Inventors: Hyun Seo Park, Daejeon (KR); Yong Jin Kwon, Daejeon (KR); Yun Joo Kim, Daejeon (KR); Eunkyung Kim, Daejeon (KR); An Seok Lee, Daejeon (KR); Yu Ro Lee, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 486 days.

(21) Appl. No.: 17/874,427

(22) Filed: Jul. 27, 2022

(65) Prior Publication Data

US 2023/0038795 A1    Feb. 9, 2023

(30) Foreign Application Priority Data

Jul. 30, 2021  (KR) .................. 10-2021-0100945
Jul. 6, 2022   (KR) .................. 10-2022-0083116

(51) Int. Cl.
*H04W 36/00*     (2009.01)
*H04W 24/10*     (2009.01)

(52) U.S. Cl.
CPC ....... *H04W 36/0079* (2018.08); *H04W 24/10* (2013.01); *H04W 36/0058* (2018.08)

(58) Field of Classification Search
CPC ..... H04W 24/02; H04W 24/08; H04W 24/10; H04W 36/0058; H04W 36/0079; H04W 36/00833; H04W 36/362
See application file for complete search history.

(56) References Cited

U.S. PATENT DOCUMENTS

| | | |
|---|---|---|
| 8,724,596 B2 | 5/2014 | Iwamura et al. |
| 8,761,121 B2 | 6/2014 | Takano et al. |
| 10,945,184 B2 | 3/2021 | Cha et al. |
| 11,064,376 B2 | 7/2021 | Yang et al. |
| 11,109,283 B1 | 8/2021 | Kulkarni et al. |
| 11,832,141 B2 * | 11/2023 | Kim .................. H04W 36/0061 |
| 2012/0164952 A1 | 6/2012 | Lee et al. |
| 2015/0038148 A1 | 2/2015 | Park et al. |
| 2022/0201582 A1 * | 6/2022 | Eklöf ..................... H04W 24/08 |
| 2023/0077387 A1 * | 3/2023 | Yan ..................... H04W 36/0033 370/331 |
| 2023/0164648 A1 * | 5/2023 | Wang ..................... H04W 24/10 370/331 |

(Continued)

*Primary Examiner* — Nguyen T Vo
(74) *Attorney, Agent, or Firm* — Rabin & Berdo, P.C.

(57) ABSTRACT

An operation method of a terminal in a communication system may comprise: receiving a first occurrence reporting condition of a handover problem from a source base station; performing a handover from the source base station to a target base station; identifying whether a handover problem occurs based on the first occurrence reporting condition while performing the handover; and in response to identifying that a handover problem occurs, transmitting information indicating the occurrence of the handover problem to the target base station.

7 Claims, 6 Drawing Sheets

(56) References Cited

U.S. PATENT DOCUMENTS

| | | | |
|---|---|---|---|
| 2023/0370933 A1* | 11/2023 | Kim | H04W 24/10 |
| 2023/0388873 A1* | 11/2023 | Wang | H04W 40/36 |
| 2024/0172061 A1* | 5/2024 | Jung | H04W 76/18 |
| 2024/0224150 A1* | 7/2024 | Chang | H04W 36/0079 |

* cited by examiner

METHOD AND APPARATUS FOR IMPROVING HANDOVER PERFORMANCE IN COMMUNICATION SYSTEM

CROSS-REFERENCE TO RELATED APPLICATIONS

This application claims priority to Korean Patent Applications No. 10-2021-0100945, filed on Jul. 30, 2021, and No. 10-2022-0083116, filed on Jul. 6, 2022, with the Korean Intellectual Property Office (KIPO), the entire contents of which are hereby incorporated by reference.

BACKGROUND

1. Technical Field

The present disclosure relates to a technique for handover performance improvement in a communication system, and more particularly, to a technique for handover performance improvement in a communication system, which can improve a handover performance by adjusting handover parameters according to occurrences of events affecting the handover performance.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

The LTE communication system and the NR communication system have introduced a conditional handover technique to reduce a handover failure probability. Using a conditional handover scheme, resource efficiency of the communication system may decrease due to waste of resources reserved for a terminal that will not actually perform handover. In addition, in the conditional handover scheme, the communication system may allow the terminal to perform the handover when a target cell has a radio channel condition that is significantly better than that of a source cell in order to reduce a ping-pong probability. Accordingly, a transmission rate of the terminal may drop due to deterioration of a link state while maintaining connection with the source cell. As a result, a perceived quality of the terminal may be deteriorated.

SUMMARY

In order to solve the above-identified problems, exemplary embodiments of the present disclosure are directed to providing a method and an apparatus for handover performance improvement in a communication system, which can improve a handover performance by adjusting handover parameters according to occurrences of events affecting the handover performance.

According to a first exemplary embodiment of the present disclosure for achieving the above-described objective, an operation method of a terminal in a communication system may comprise: receiving a first occurrence reporting condition of a handover problem from a source base station; performing a handover from the source base station to a target base station; identifying whether a handover problem occurs based on the first occurrence reporting condition while performing the handover; and in response to identifying that a handover problem occurs, transmitting information indicating the occurrence of the handover problem to the target base station.

The first occurrence reporting condition may be received from the source base station through a radio resource control (RRC) reconfiguration message.

The information indicating the occurrence of the handover problem may be a handover problem indicator included in an RRC reconfiguration complete message transmitted to the target base station, and the handover problem indicator may be set to a value indicating that information on the handover problem is available.

The identifying of whether the handover problem occurs may comprise: recognizing the occurrence of the handover problem while performing the handover; determining whether the recognized handover problem corresponds to the first occurrence reporting condition; and in response to determining that the recognized handover problem corresponds to the first occurrence reporting condition, recording a context of the handover problem.

The operation method may further comprise: receiving a transmission request for a content report of the reported handover problem from the target base station; and transmitting the content report to the target base station.

The first occurrence reporting condition may include at least one of a type or a number of occurrences of the handover problem.

Types of the handover problem may include at least one of an outage problem, a short time-of-stay problem, a ping-pong handover problem, a handover interruption time problem, a duplicate data reception problem, a non-optimal target handover problem, a multiple candidate cell configuration problem, an over-measurement information transmission problem, or combinations thereof.

The operation method may further comprise: receiving, from the source base station, a second occurrence reporting condition of a radio link failure (RLF) recovery problem; performing an RLF recovery with a target base station when an RLF occurs; identifying whether or not an RLF recovery problem occurs based on the second occurrence reporting condition while performing the RLF recovery; and in response to identifying that the RLF recovery problem occurs, transmitting information indicating the occurrence of the RLF recovery problem to the target base station.

The identifying of the whether or not the RLF recovery problem occurs may comprise: recognizing the occurrence of the RLF recovery problem while problem the RLF recovery; determining whether the recognized RLF recovery problem corresponds to the second occurrence reporting condition; and in response to determining that the recognized RLF recovery problem corresponds to the second occurrence reporting condition, recording a content of the RLF recovery problem to identify whether the RLF recovery problem occurs.

According to a second exemplary embodiment of the present disclosure for achieving the above-described objective, an operation method of a source base station in a communication system may comprise: transmitting a first occurrence reporting condition of a handover problem to a first terminal; performing a handover of the first terminal from the source base station to a target base station; and in response to identifying that a handover problem corresponding to the first occurrence reporting condition occurs between the source base station and the first terminal while performing the handover, receiving, from the target base station, a content report on the handover problem occurring between the source base station and the first terminal.

The operation method may further comprise: adjusting a handover parameter according to the content report; transmitting the adjusted handover parameter to a second terminal connected to the source base station; and transmitting the adjusted handover parameter to the target base station.

The handover parameter may be at least one of a handover margin and a trigger time.

Types of the handover problem may include at least one of an outage problem, a short time-of-stay problem, a ping-pong handover problem, a handover interruption time problem, a duplicate data reception problem, a non-optimal target handover problem, a multiple candidate cell configuration problem, an over-measurement information transmission problem, or combinations thereof.

The first occurrence reporting condition may include at least one of a type or a number of occurrences of the handover problem.

According to a third exemplary embodiment of the present disclosure for achieving the above-described objective, an operation method of a target base station in a communication system may comprise: performing a handover of a terminal from a source base station to the target base station; receiving, from the terminal, information indicating that a handover problem corresponding to a first occurrence reporting condition occurs between the source base station and the terminal while performing the handover; and receiving a content report of the reported handover problem from the terminal.

The information indicating that the handover problem occurs may be a handover problem indicator included in an RRC reconfiguration complete message, and the handover problem indicator may be set to a value indicating that information on the handover problem is available.

The receiving of the content report of the reported handover over may comprise: requesting transmission of the content report of the reported handover problem to the terminal; and receiving the content report of the reported handover problem from the terminal.

The operation method may further comprise: transmitting the content report received from the terminal to the source base station; receiving a handover parameter adjusted according to the content report from the source base station; and updating a handover parameter of the target base station by reflecting the adjusted handover parameter.

According to the exemplary embodiments of the present disclosure, the base station can receive a report on occurrence of an event affecting the handover performance and specific details thereof from the terminal. That is, the base station can receive a report on occurrence of at least one event and detailed content thereof affecting the handover performance, which includes at least one of an outage problem, a short time-of-stay problem, a ping-pong handover problem, a handover interruption time problem, a duplicate data reception problem, a non-optimal target handover problem, a multi-candidate cell configuration problem, an excessive measurement information transmission problem, or combinations thereof.

Accordingly, the base station can improve the handover performance by appropriately adjusting handover parameters in cooperation with other base stations related to the received event. That is, the base station can improve the handover performance by adjusting handover parameters related to a handover preparation operation or handover parameters related to a handover execution operation.

DETAILED DESCRIPTION OF THE EMBODIMENTS

Figure 1:
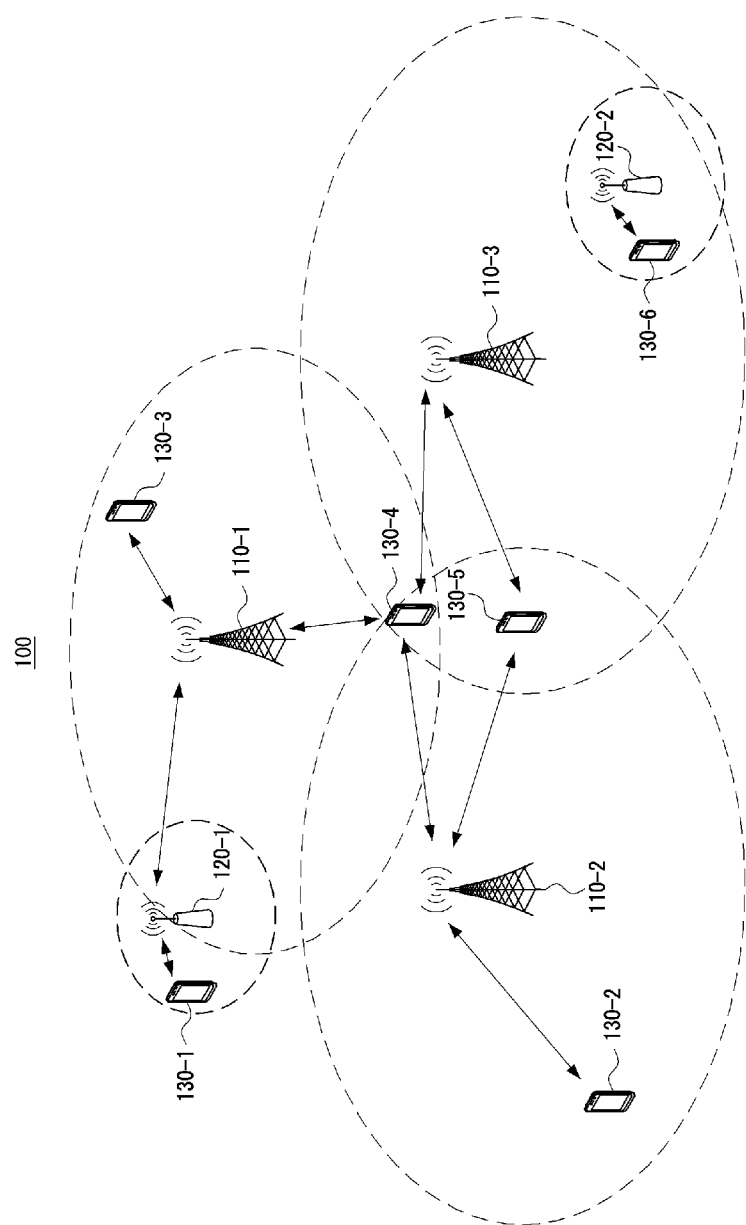
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
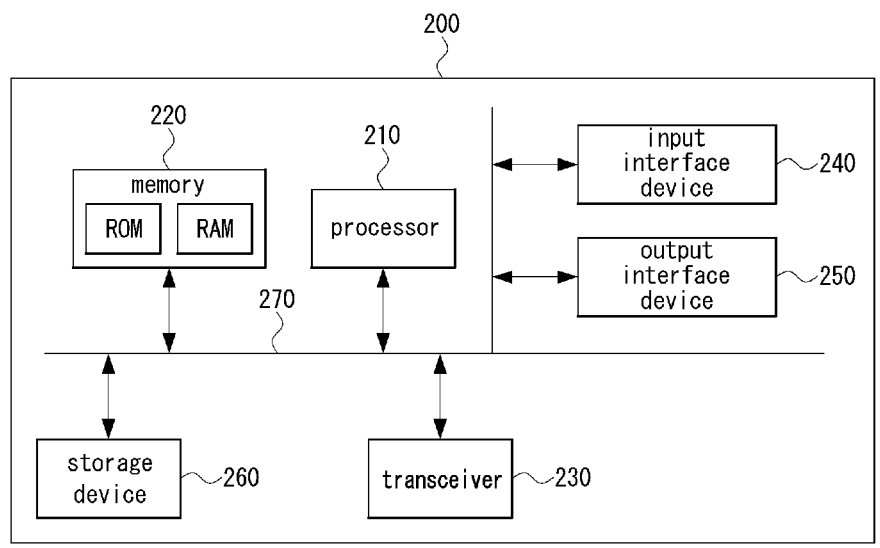
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
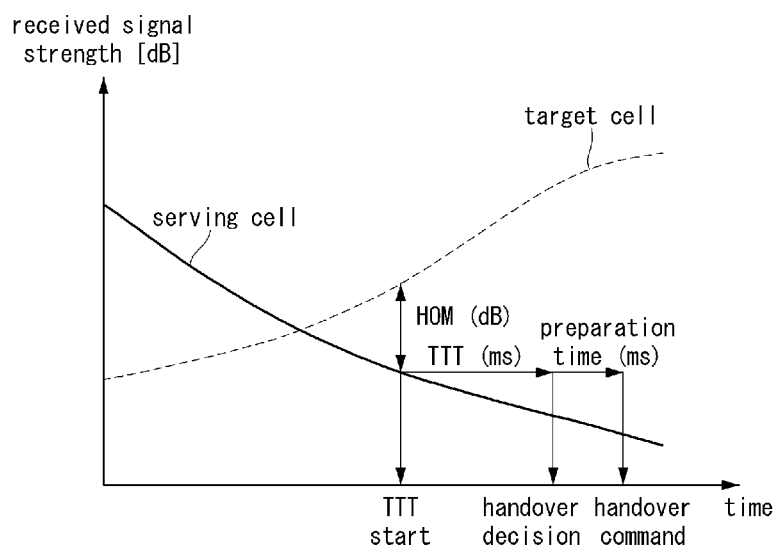
FIG. 3 is a graph for describing a handover timing in a handover method.

FIG. 3 is a graph for describing a handover timing in a handover method.

Referring to FIG. 3, in a handover method, a terminal may measure a strength of a signal received from a source base station and strengths of signals received from neighboring base stations. For example, the terminal may measure a reference signal received power (RSRP) of the source base station. In addition, the terminal may measure an RSRP of each of the neighboring base stations. A unit of the RSRP may be dBm. Here, a wireless communication system may be the same as or similar to the wireless communication system 100 of FIG. 1. In addition, a structure of each of the terminal, the source base station, and the neighboring base stations may be the same as or similar to the structure of the communication node 200 of FIG. 2.

The terminal may determine whether a state in which a difference between a received signal strength of a target base station among the neighboring base stations and a received signal strength of the source base station is equal to or greater than a handover margin (HOM) continues for a predetermined time. Here, a unit of HOM may be dB. For example, when the difference between the received signal strength of the target base station and the received signal strength of the source base station is equal to or greater than HOM for a predetermined trigger time (i.e., time-to-trigger, TTT), the terminal may transmit a measurement report message to the source base station. A unit of TTT may be ms.

Here, the measurement report message may include channel state information including information on the received signal strength of each of the source base station and the neighboring base stations. HOM may be a first offset for an A3 event. The A3 event may mean a case in which a received signal strength of a neighboring base station is greater than the received signal strength of the source base station by the first offset or more.

The source base station may receive the measurement report message from the terminal. The source base station may determine a handover of the terminal based on the received signal strength of each of the source base station and neighboring base stations included in the measurement report message. In this case, the source base station may transmit a handover preparation message to the target base station to which the terminal is to handover. The target base station may receive the handover preparation message from the source base station.

The target base station may determine whether to accept the handover of the terminal based on the handover preparation message. The target base station may transmit a handover preparation response message including information indicating whether to accept the handover of the terminal to the source base station.

The source base station may receive the handover preparation response message from the target base station. When the handover preparation response message includes information indicating that the handover of the terminal is accepted, the source base station may transmit a handover command message for instructing the terminal to perform the handover. Here, the handover command message may be a radio resource control (RRC) connection reconfiguration message.

Meanwhile, the LTE and NR communication systems may mainly use a handover failure probability and a ping-pong probability when evaluating a handover performance. The handover failure probability and the ping-pong probability may have a trade-off relationship. If the communication system triggers a handover quickly using a small HOM or a short TTT, the handover failure probability may be reduced. However, the ping-pong probability may increase. Conversely, if the communication system triggers a handover slowly by using a large HOM or a long TTT, the ping-pong probability may be reduced. However, the handover failure probability may increase.

Accordingly, the communication system may configure the handover parameters to obtain a low handover failure probability while satisfying an appropriate ping-pong probability in order to improve the handover performance. In this case, the communication system may optimize the handover parameters in consideration of the trade-off between the handover failure probability and the ping-pong probability in order to improve the handover performance. Here, the handoff parameters may be at least one of HOM and TTT.

Meanwhile, the LTE communication system and the NR communication system have introduced a conditional handover technique to reduce the handover failure probability. In the conditional handover scheme, the source base station may allow the target base station to prepare for a handover in advance. In the conditional handover scheme, the terminal may not perform the handover immediately after receiving a handover command message. When a received signal strength of a target cell satisfies a predetermined condition, the terminal may perform the handover to the corresponding target cell.

In such the conditional handover scheme, the source base station may make a plurality of candidate target base stations perform handover preparation operations prior to an actual handover time in order to reduce the handover failure probability. Accordingly, when using the conditional handover scheme, a resource efficiency of the communication system may decrease due to waste of resources reserved for a terminal that will not actually perform the handover. In addition, in the conditional handover scheme, the communication system may allow the terminal to perform the handover when the target cell has a radio channel condition that is significantly better than that of the source cell in order to reduce the ping-pong probability. In this case, a transmission rate of the terminal may drop due to a deterioration of a link state while maintaining a connection with the source cell. Accordingly, a perceived quality of the terminal may be deteriorated.

On the other hand, after disconnecting from the source base station in the handover, the terminal may not receive data until it connects to the target base station. A time required for the terminal to connect to the target base station after disconnecting from the source base station may be referred to as an interruption time. In the LTE communication system, a handover interruption time may be, for example, about 50 ms. In the NR communication system, a handover interruption time may be longer than the handover interruption time of the LTE communication system due to additional beam sweeping to access the target cell.

Meanwhile, the source base station may transmit the handover command message to the terminal after determining the handover of the terminal. In this case, a radio link state between the source base station and the terminal in a handover region where the terminal is located may not be good. Accordingly, the source base station may not receive the measurement report message transmitted from the terminal in real time. In addition, the terminal may not receive the handover command message transmitted from the base station in real time.

Therefore, the handover may fail depending on the radio link state between the terminal and the source base station. In this case, the terminal may declare a radio link failure (RLF), and the terminal may re-establish a connection with the base station through an RLF recovery procedure. If the RLF recovery procedure fails, the terminal may re-establish the connection with the base station through an initial access procedure. In this case, when there is RLF information including a handover failure to be reported to the base station, the terminal may inform the base station that the corresponding information is present.

Figure 4:
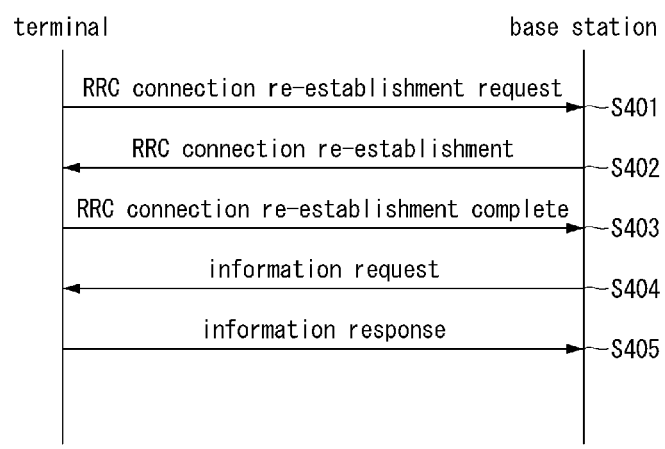
FIG. 4 is a sequence chart for describing an RLF reporting method.

FIG. 4 is a sequence chart for describing an RLF reporting method.

Referring to FIG. 4, in an RLF reporting method, the terminal may transmit an RRC connection re-establishment request message to the base station (S401). Then, the base station may receive the RRC connection re-establishment request message from the terminal. In response thereto, the base station may transmit an RRC re-establishment message to the terminal (S402). Then, the terminal may receive the RRC re-establishment message from the base station.

Thereafter, the terminal may transmit an RRC re-establishment complete message to the base station (S403). In this case, the terminal may have RLF information including a handover failure to be reported to the base station. In this case, the terminal may inform the base station of this fact through the RRC re-establishment complete message. As an example, the terminal may transmit the RRC re-establishment complete message to the base station by setting an RLF information indicator (e.g., rlf-Info) to 'AVAILABLE'.

Accordingly, the base station may receive from the terminal the RRC re-establishment complete message including the RLF information indicator set to 'AVAILABLE'. Accordingly, the base station may recognize that the terminal has the RLF information including the handover failure.

Meanwhile, when necessary, the base station may transmit an information request message for requesting a report on the RLF information to the terminal (S404). As an example, the base station may transmit the information request message to the terminal by setting an RLF information report request indicator (e.g., rlf-ReportReq) to 'TRUE'. Accordingly, the terminal may receive the information request message including the RLF information report request indicator set to 'TRUE' from the base station.

Then, the terminal may transmit an information response message including an RLF information report to the base station (S405). Accordingly, the base station may receive the information response message including the RLF information report from the terminal. Thereafter, the base station may improve the handover performance by appropriately adjusting the handover parameters in cooperation with other base stations related to the RLF information.

As described above, the LTE and NR communication systems have introduced the conditional handover technique to reduce the handover failure probability. The LTE and NR communication systems may extremely configure a handover preparation condition and a handover execution condition in the conditional handover. Then, the LTE and NR communication systems may completely eliminate the handover failure and ping-pong.

However, a resource efficiency of the communication system may rapidly decrease due to excessive handover preparation operations. In addition, the terminal may maintain a connection with the source cell in a poor link state. As a result, a perceived quality of the terminal may be further deteriorated. As such, the handover performance of the communication system may not be expected to be greatly improved only by the handover failure information.

In order to solve such the problem, in the conditional handover scheme, when the handover is successful, the terminal may report occurrence of events affecting the handover performance to the base station. In not only the conditional handover but also the normal handover, when the handover is successful, the terminal may report occurrence of events affecting the handover performance to the base station.

Accordingly, the base station may improve the handover performance by receiving information on a context of the event affecting the handover performance from the terminal and appropriately adjusting the handover parameters in cooperation with other base stations related to the event. Here, the event affecting the handover performance may be referred to as a handover problem. In addition, the context of the event may include a type and content of the event.

Figure 5:
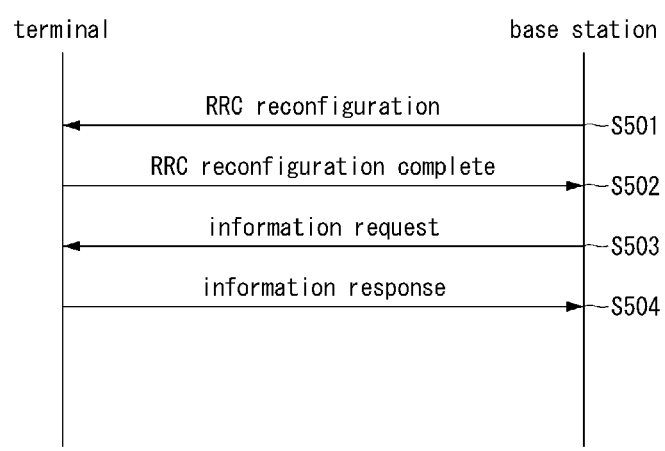
FIG. 5 is a sequence chart for describing a first exemplary embodiment of a method for reporting a handover problem.

FIG. 5 is a sequence chart for describing a first exemplary embodiment of a method for reporting a handover problem.

Referring to FIG. 5, in a handover problem reporting method, the base station may transmit an RRC reconfiguration message to the terminal (S501). In this case, the base station may request the terminal to configure a function for reporting a context of a handover problem occurring during handover through the RRC reconfiguration message. Here, the function for reporting a context of a handover problem may be briefly referred to as a 'handover problem reporting function'.

Accordingly, the terminal may receive the RRC reconfiguration message from the base station. In addition, according to the request of the base station in the RRC reconfiguration message, the terminal may configure the function for reporting a context of a handover problem occurring during a handover.

Thereafter, the terminal may transmit an RRC reconfiguration complete message to the base station (S502). In this case, the terminal may record and manage a handover problem occurring during a handover process. As such, the terminal may have a handover problem to be reported to the base station.

In this case, the terminal may inform the base station of the fact that it has the handover problem through the RRC reconfiguration complete message. In this manner, the terminal may report the occurrence of the handover problem to the base station through the RRC reconfiguration complete message. As an example, the terminal may transmit, to the base station, the RRC reconfiguration complete message including a handover problem information indicator (e.g., hp-Info) set to 'AVAILABLE' in order to inform the base station of the fact that the terminal has the handover problem to be reported. That is, the terminal may report the occurrence of the handover problem to the base station by transmitting the RRC reconfiguration complete message including the handover problem information indicator set to 'AVAILABLE' to the base station.

Accordingly, the base station may receive the RRC reconfiguration complete message including the notification that the terminal has the handover problem to be reported. That is, the base station may receive the report on the occurrence of the handover problem from the terminal. Then, when necessary, the base station may transmit an information request message requesting a report on the handover problem to the terminal (S503). As an example, the base station may transmit the information request message including a handover problem report request indicator (e.g., hp-ReportReq) set to 'TRUE' to the terminal.

Accordingly, the terminal may receive the information request message including the handover problem report request indicator set to 'TRUE' from the base station. Then, the terminal may transmit an information response message including a context report of the handover problem (i.e., a report on the handover problem) to the base station (S504). Accordingly, the base station may receive the information response message including the context report on the handover problem from the terminal. Thereafter, the base station may improve the handover performance by appropriately adjusting the handover parameters in cooperation with other base stations related to the handover problem.

Figure 6:
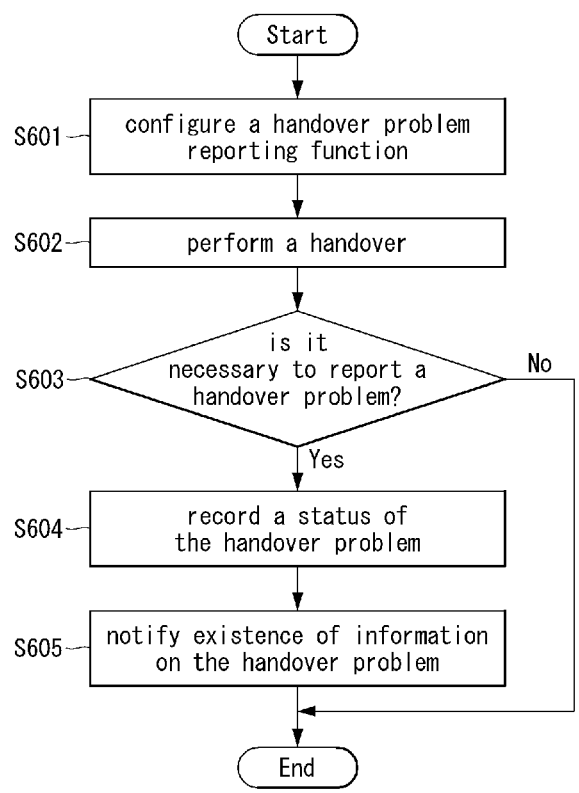
FIG. 6 is a flow chart illustrating a first exemplary embodiment of a method for recording a handover problem.

FIG. 6 is a flow chart illustrating a first exemplary embodiment of a method for recording a handover problem.

Referring to FIG. 6, in a handover problem recording method, the base station may transmit configuration information for configuring a function for reporting a context of a handover problem occurring during handover to the terminal. Here, the function for reporting a context of a handover problem may be briefly referred to as a handover problem reporting function. In this case, the base station may transmit the configuration information to the terminal by using a message transmitted to the terminal in an one-to-one manner. Alternatively, the base station may transmit the configuration information to the terminal using a message broadcast to the entire system.

In this case, the configuration information may include a flag indicating whether or not it is necessary to report a handover problem when the handover problem occurs during handover. For example, the flag set to '1' may indicate that it is necessary to report the handover problem. Alternatively, the flag set to '0' may indicate that it is not necessary to report the handover problem. In addition, the configuration information may include information informing a context of the handover problem to be reported. Here, the context may include a type and a content of the handover problem.

In addition, the configuration information may include a specific condition corresponding to a case of reporting occurrence of a handover problem. Here, the specific condition may be, for example, occurrence of a specific type of handover problem. Also, the specific condition may be, for example, occurrence of a handover problem a certain number of times. In this case, the predetermined number of times may be at least one or more. In this case, a threshold value may be required to determine whether the specific condition is satisfied. In this case, the configuration information may include the threshold value. In this manner, the terminal may receive the configuration information for configuring the function for reporting a handover problem occurring during handover from the base station.

Then, the terminal may configure the handover problem reporting function according to the received configuration information (S601). As such, the terminal may configure the handover problem reporting function according to a request from the base station. Alternatively, the terminal may configure the handover problem reporting function according to predetermined configuration information without a request from the base station.

Meanwhile, the terminal may perform a handover at a request of the base station or according to determination of the terminal (S602). As such, when the terminal performs the handover, a handover problem may occur. In this case, when the terminal recognizes the occurrence of the handover problem, the terminal may collect, store, and manage information on the handover problem.

In this manner, when the terminal recognizes the occurrence of the handover problem, information on the handover problem may be collected and managed without any condition. Alternatively, the information on the handover problem may be collected and managed when a predetermined condition is satisfied. That is, the terminal may determine whether it is necessary to report the handover problem that has occurred (S603).

In this case, when the handover problem reporting function is configured, the terminal may determine that it is necessary to report the occurred handover problem. In addition, if it is configured to report the handover problem when a specific condition is satisfied, the terminal may determine whether the specific condition is satisfied and determine that it is necessary to report the handover problem when the specific condition is satisfied.

When it is determined that the terminal needs to report the handover problem, the context of the occurred handover problem may be recorded (S604). The terminal may record the context of the handover problem and configure the recorded context information of the handover problem to be valid. Thereafter, the terminal may notify the base station of the existence of the context information of the handover problem (S605). That is, the terminal may report the occurrence of the handover problem to the base station. In this case, the terminal may inform the target cell of the existence of the context information of the handover problem using a handover complete message.

Alternatively, after transmitting the handover complete message, the terminal may use another message to inform the base station of the existence of the context information of the handover problem. Meanwhile, when necessary, the base station may transmit an information request message requesting a report on the context information of the handover problem to the terminal.

Accordingly, the terminal may receive the information request message including the report request on the context information of the handover problem from the base station. Thereafter, the terminal may transmit an information response message including the context information of the handover problem to the base station. Accordingly, the base station may receive the information response message including the context information of the handover problem from the terminal.

In this case, the terminal may configure the context information of the handover problem to be invalid after transmitting the context information of the handover problem to the base station. Alternatively, the terminal may configure the context information of the handover problem to be invalid any longer before performing a next handover.

Meanwhile, the context information of the handover problem may include a type and a content of the handover problem. Here, the type of the handover problem may indicate the type of the recorded handover problem. The handover problems affecting the handover performance may include at least one of an outage problem, short time-of-stay problem, ping-pong handover problem, handover interruption time problem, duplicate data reception problem, non-optimal target handover problem, multiple candidate cell configuration problem, excessive measurement information transmission problem, or combinations thereof.

(1) Type 1: Outage Problem

A radio link state may rapidly deteriorate due to a signal to interference plus noise ratio (SINR) of a serving cell lower than a specific threshold. Accordingly, data transmission/reception errors may occur frequently. A state in which data transmission/reception errors frequently occur due to the deteriorated radio link state may be referred to as an outage.

The outage may mean a state in which data transmission/reception errors may occur frequently because the SINR of the serving cell is lower than a specific threshold value and thus the radio link state is not good. A physical layer (PHY layer) may define an out-of-sync (OOS) state identically to the outage. The OOS state may mean a case in which a received signal strength of the source base station is less than Qout. Here, Qout indicates a case in which a block error rate (BLER) of a physical downlink control channel (PDCCH) is usually at a level of 10%, and may be −8 dB when expressed in SINR.

Contrary to this, an in-sync (IS) state may mean a state in which the SINR of the serving cell is higher than a specific threshold value and thus recovered from the OOS state due to improvement of the radio link state. The IS state may mean a case in which the received signal strength of the source base station is greater than or equal to Qin. Here, Qin indicates a case where the BLER of the PDCCH is usually 2%, and may be −6 dB when expressed in SINR.

The physical layer of the terminal may inform the RRC layer of the occurrence of the OOS state when the SINR of the serving cell is less than Qout. Also, when the SINR of the serving cell is Qin or more, the physical layer of the terminal may inform the RRC layer of the occurrence of the IS state. When the RRC layer of the terminal continuously receives the notification signal of the OOS state a first number of times (e.g., N310 of LTE or NR), it may start a first timer (e.g., T310 timer of LTE or NR).

Here, the T310 timer may be a timer for determining an RLF. On the other hand, the RRC layer of the terminal may stop the first timer when continuously receiving the notification signal of the IS state a second number of times (e.g., N311 of LTE or NR). When the received signal strength of the source base station is less than Qin, the first timer may expire. In this case, the RRC layer of the terminal may declare an RLF according to the expiration of the first timer, and may perform an RLF recovery procedure.

On the other hand, the handover failure probability may be increased due to rough transmission and reception of handover related messages, which are caused by an outage of the source cell. In addition, the handover performance may be degraded due to a delay of handover signaling due to a transmission error of a handover-related message cause by the outage of the source cell. Accordingly, the handover performance may be improved by reducing the outages occurring during handover.

In this regard, the outage determined by the physical layer and the outage determined by the RRC layer may be different from each other. The physical layer may determine the OOS state based on an average result of monitoring the radio link for a certain period of time. Accordingly, a start time of the outage recognized by the physical layer may be earlier than a time at which the physical layer notifies the RRC layer of the occurrence of the OOS state.

Accordingly, the physical layer may define a total time for which the outage occurs as an outage time according to a result of monitoring the radio link. Alternatively, the RRC layer may define a total time from a time when receiving the notification of the occurrence of the OOS state from the physical layer until a time when receiving the notification of the occurrence of the IS state as an outage time. The terminal may determine that an outage problem occurs when each outage time is greater than a specific threshold.

Meanwhile, the RRC layer of the terminal may report the occurrence of the outage problem to the base station upon receiving the notification of the occurrence of the OOS state from the physical layer. In this case, the terminal may report the number of outage occurrences (i.e., the number of notifications of occurrences of the OOS state) and each outage time of the occurrences to the base station. Alternatively, the RRC layer of the terminal may report the occurrence of the outage problem to the base station when the number of notifications of occurrences of the OOS state is greater than a specific threshold. In this case, the RRC layer of the terminal may report to the base station the number of notifications of occurrences of the OOS state continuously received from the physical layer. In this case, the RRC layer of the terminal may report the outage time of each OOS state to the base station.

Alternatively, the RRC layer of the terminal may report a driving time of the first timer (i.e., T310 timer) to the base station as an outage time. The RRC layer of the terminal may report the occurrence of the outage problem to the base station only when the driving time of the first timer is greater than a specific threshold. In this manner, the terminal may report to the base station whether an outage problem occurs during handover. In addition, the terminal may report each outage time or the number of occurrences of the outage to the base station in addition to reporting whether the outage problem has occurred.

(2) Type 2: Time-of-Stay Problem

The terminal may access the serving cell for a shorter time than a specific time, thereby having a short time-of-stay access. Here, the specific time may be defined as 1 second. If the terminal accesses the serving cell only for a short time-of-stay (or dwell time), a ratio of a handover interruption time may increase due to the frequent handovers. As a result, a communication quality may deteriorate.

In addition, overall system performance may be degraded due to excessive handover signaling and waste of resources prepared for the terminal. The terminal may report an occurrence of a time-of-stay problem to the base station when a time-of-stay is less than a specific threshold. In this case, the terminal may report to the base station only whether or not the time-of-stay problem occurs. Alternatively, the terminal may report a short time-of-stay to the base station in addition to whether the time-of-stay problem has occurred.

(3) Type 3: Ping-Pong Handover Problem

The terminal may perform a handover from a source cell to a target cell. In this case, the target cell may be a cell accessed before the source cell. In addition, a time for which the terminal accesses the source cell may be shorter than a specific time. In this case, the terminal may determine that a ping-pong handover problem has occurred.

In most cases of such the ping-pong handover, a communication quality may be deteriorated due to an increase of a ratio of an handover interruption time due to frequent occurrences of unnecessary handovers. In addition, the overall system performance may be degraded due to excessive handover signaling and waste of resources prepared for the terminal.

In this case, the terminal may report the occurrence of the ping-pong handover problem to the base station when the time for which the terminal accesses the source cell is less than a specific threshold. In this case, the terminal may report only whether or not the ping-pong handover problem occurs to the base station. Alternatively, the terminal may report information on the time for which the terminal accesses the source cell to the base station in addition to whether or not the ping-pong handover problem occurs.

(4) Type 4: Handover Interruption Time Problem

The handover interruption time may mean a time from when the terminal last received data from the source cell to the time when the terminal first receives data from the target cell after performing the handover. The handover interruption time may include a downlink interruption time and an uplink interruption time. In this case, the handover interruption time may be defined differently at a physical layer, a packet data convergence protocol (PDCP) layer, or a higher layer of the PDCP layer.

Accordingly, a physical layer downlink interruption time may be measured as a time from when downlink scheduling information is received last from the source cell to a time when downlink scheduling information is received first from the target cell after performing the handover. A physical layer uplink interruption time may be measured as a time from a time when uplink scheduling information is received last from the source cell to a time when uplink scheduling information is received first from the target cell after performing the handover.

A PDCP layer downlink interruption time may be measured as a time from a time when a PDCP protocol data unit (PDU) is received last from the source cell to a time when a PDCP PDU is received first from the target cell after performing the handover. A PDCP layer uplink interruption time may be measured as a time from the a when a PDCP PDU is transmitted last from the source cell to a time when a PDCP PDU is transmitted first from the target cell after performing the handover. A downlink interruption time of the higher layer of the PDCP layer may be measure as a time from a time when a PDU of the higher layer of the PDCP is received last from the source cell to a time when a PDU of the higher layer of the PDCP is received first from the target cell after performing the handover. The terminal may report occurrence of a handover interruption time problem to the base station only when a handover interruption time is greater than a specific threshold. In this case, the terminal may report to the base station only whether the handover interruption time problem occurs. Alternatively, the terminal may report information on the handover interruption time to the base station in addition to whether the handover interruption time problem occurs. Alternatively, the terminal may report the interruption time of all handovers to the base station. Alternatively, the terminal may measure the handover interruption time by dividing the interruption time into an interruption time in the source cell and an interruption time in the target cell, and report them to the base station. The terminal may measure the handover interruption time for each detailed step and report it to the base station. For example, the terminal may measure the interruption time for each step by applying Table 1 below and report it to the base station.

TABLE 1

| Step | Description | Time (ms) |
|---|---|---|
| 1 | RRC connection reconfiguration step | 15 |
| 2 | Sequence number (SN) status transmission step | 0 |
| 3 | Target cell discovery step | 0 |
| 4 | Radio frequency (RF)/baseband retuning step, and security update step | 20 |
| 5 | Step of acquiring available physical random access channel (PRACH) resources of a target cell | 0.5/2.5 |
| 6 | PRACH preamble transmission step | 1 |
| 7 | Uplink allocation step, and timing advance assignment step | 3/5 |
| 8 | RRC connection reconfiguration complete step | 6 |

(5) Type 5: Duplicate Data Reception Problem

After performing the handover, the terminal may discard PDCP PDUs received from the target cell, which have been received from the target cell. The terminal may determine such a case as a duplicate data reception problem. In this case, a communication quality may be degraded by discarding the initial PDCP PDUs received from the target cell. When the number of duplicately received PDUs is greater than a specific threshold, the terminal may report occurrence of the duplicate data reception problem to the base station.

As a method of reporting the duplicate data reception problem, the terminal may report only whether the duplicate data reception problem occurs to the base station. Alternatively, the terminal may report information on duplicate data in addition to whether or not the duplicate data reception problem occurs. Here, the information on the duplicate data may use a message format similar to that of a PDCP status PDU, and may indicate an SN of the PDCP PDU received first from the target cell, an SN of the PDCP PDU received last from the source cell, and a flag indicating whether PDUs are duplicated therebetween.

(6) Type 6: Non-Optimal Target Handover Problem

The terminal may perform handover to a target cell other than the best neighboring cell at the time of handover execution. The terminal may determine such a case as occurrence of a non-optimal target handover (i.e., handover to a not best target) problem. The terminal may apply layer 3 filtering in order to reduce an effect due to a sudden change in signal strength. In addition, the terminal may apply a trigger time to trigger a handover when the target cell is sufficiently stable and in a good state.

In addition, signal strength measurement information may change during a time required for an operation of preparing for a handover between base stations. Accordingly, the terminal may perform handover to a target cell other than the best neighboring cell at the time of handover execution. In this case, a communication quality may be degraded by a cell handover to the optimal cell again after a short handover.

In this case, when a difference between a signal strength of the non-optimal target and a signal strength of the optimal target is greater than a specific threshold, the terminal may report occurrence of the non-optimal target handover problem to the base station. As a method of reporting the non-optimal target handover problem, the terminal may report only whether the non-optimal target handover problem occurs to the base station.

Alternatively, the terminal may report to the base station information on the optimal target and information on each measurement result in addition to whether the non-optimal target handover problem occurs. The terminal may determine whether such the non-optimization occurs by using a layer 1 (L1) measurement result. In addition, the terminal may determine the non-optimization by using the measurement value to which the layer 3 filtering is applied.

(7) Type 7: Multiple Candidate Cell Configuration Problem

In the conditional handover scheme, the terminal may configure several candidate cells as handover candidate cells. The terminal may determine such a case as occurrence of a multi-candidate cell configuration problem. In this case, the overall system performance may be degraded due to excessive handover signaling and waste of resources prepared for the handover of the terminal.

In such a case, when the number of handover candidate cells is greater than a specific threshold, the terminal may report the occurrence of the multi-candidate cell configuration problem to the base station. As a method of reporting the multi-candidate cell configuration problem, the terminal may report whether the multi-candidate cell configuration problem occurs to the base station. Alternatively, the terminal may report to the base station information on the configuration of the plurality of candidate cells in addition to whether or not the multi-candidate cell configuration problem occurs.

(8) Type 8: Excessive Measurement Information Transmission Problem

Meanwhile, an excessive measurement information transmission problem may occur when the terminal transmits too much measurement information for handover. In such a case, the terminal may determine occurrence of the excessive measurement information transmission problem. In this case, the overall system performance may be degraded due to excessive handover signaling and waste of resources prepared for the handover of the terminal.

In such a case, when the number of times of transmission of measurement information uplink signaling for handover is greater than a specific threshold, the terminal may report the occurrence of the excessive measurement information transmission problem to the base station. As a method of reporting the excessive measurement information transmission problem, the terminal may report to the base station only whether or not the excessive measurement information transmission problem occurs. Alternatively, the terminal may report to the base station information on the excessive measurement information transmission problem in addition to whether the excessive measurement information transmission problem occurs.

The context information of all handover problems may additionally include measurement results of serving cells including the source cell. In addition, the context information of all handover problems may additionally include measurement results of neighboring cells. In addition, the context information of the handover problem may include a terminal identifier and may include information on a cell accessed before the handover is performed. In addition, the context information of the handover problem may additionally include information on a position of the terminal in which the problem occurs.

Meanwhile, the terminal may transmit the context information of the handover problem to the target base station. Then, the target base station may receive the context information of the handover problem from the terminal. Thereafter, the target base station may adjust handover parameters in cooperation with other base stations related to the handover problem, including the source base station, to improve the handover performance.

Figure 7:
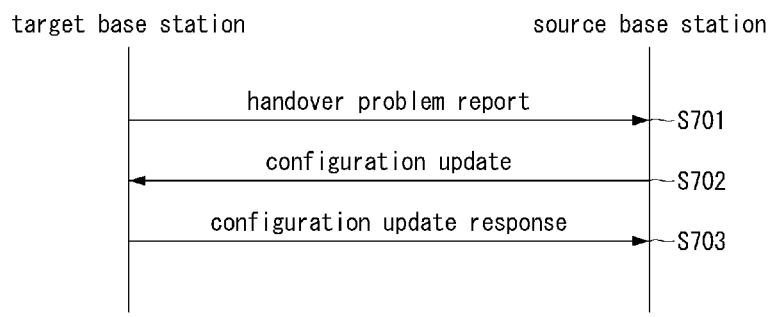
FIG. 7 is a sequence chart illustrating a first exemplary embodiment of a handover performance improvement method.

FIG. 7 is a sequence chart illustrating a first exemplary embodiment of a handover performance improvement method.

Referring to FIG. 7, in a handover performance improvement method, the target base station may transmit the context information of the handover problem to the source base station through a handover problem report message (S701). Here, the context information of the handover problem may include a type and a content of the handover problem received by the target base station from the terminal.

Then, the source base station may receive the handover problem report message including the context information of the handover problem from the target base station. Here, it has been expressed that the target base station transmits the context information of the handover problem only to the source base station, but is not limited thereto, and the target base station may transmit the context information to other related base stations.

The source base station may update an handover algorithm and the handover parameters to optimize the handover performance based on the context information of the handover problem received from the target base station. As an example, the outage problem may be caused by a handover trigger that is too late.

Accordingly, the source base station may solve such the outage problem by updating the handover parameters to trigger the handover earlier. The handover problems may have a trade-off relationship with each other. Accordingly, the source base station may need to perform complex calculations based on various data to configure the handover parameters for optimizing the handover performance.

The source base station may use machine learning to optimize the handover parameters to improve the handover performance. That is, the source base station may make necessary inferences and decisions through machine learning based on the collected data. In addition, the source base station may update system configuration information including the handover parameters to improve the overall system performance by reflecting such the inferences and decisions in the communication system.

The source base station may improve the handover performance by configuring improved handover parameters to other terminals accessing the source base station. In addition, the source base station may transmit the updated system configuration information to the target base station so that the updated system configuration information is reflected to system configuration information of the target base station. To this end, the source base station may transmit a configuration update message including the updated system configuration information to the target base station (S702).

Then, the target base station may receive the configuration update message including the updated system configuration information from the source base station. The target base station may update its system configuration information by reflecting the received updated system configuration information. Then, the target base station may transmit a configuration update response message to the source base station in response to the configuration information update message (S703). Then, the source base station may receive the configuration update response message from the target base station.

Meanwhile, the terminal may transmit a measurement result of the serving cell and the measurement results of the neighboring cells to the source base station. Then, the source base station may receive the measurement result of the serving cell and the measurement results of the neighboring cells from the terminal. Thereafter, the source base station may predict an optimal target cell of the terminal based on the measurement result of the serving cell and the measurement results of the neighboring cells received from the terminal. In addition, the source base station may predict an optimal time to perform the handover based on the measurement result of the serving cell and the measurement results of the neighboring cells received from the terminal. As described above, the source base station may improve the handover performance by preparing for the handover in advance based on the predicted target cell and the time to perform the handover.

To this end, the source base station may configure the terminal to perform a measurement reporting for handover prediction. The source base station may request the terminal to transmit a measurement result when the measurement result satisfying a specific condition lasts for a specific time. In addition, the source base station may request the terminal to transmit measurement results satisfying a specific condition when the number of measurement results satisfying the specific condition reaches a specific number of times.

For example, when a neighboring cell A having a link state superior to that of the source cell appears and the neighboring cell A maintains the link state superior to that of the source cell during three times of measurement, the terminal may transmit the three measurement results to the source base station. The source base station may make necessary inferences and decisions through machine learning from the collected measurement results, and based on this, the source base station may predict a target cell to which the terminal is to hand over and a time to perform the handover, and prepare for the handover in advance, thereby improving the handover performance.

Meanwhile, the radio link state with the source base station may not be good at a timing or in a spatial region in which the terminal can perform the handover. In this case, the source base station may not be able to receive the measurement report on the signal strength of the neighboring base station transmitted from the terminal in real time. In addition, the terminal may not receive a handover command from the source base station in real time. Accordingly, a time for which data transmission and reception to and from the source base station is interrupted while the terminal performs the handover may increase, and thus communication quality may be deteriorated.

The terminal may trigger the handover when a difference between a received signal strength of the target base station and a received signal strength of the source base station is greater than or equal to a predetermined threshold. In this case, although the received signal strength of the source base station is low, the terminal may not trigger the handover when the difference between the received signal strength of the target base station and the received signal strength of the source base station is less than a predetermined threshold value. Accordingly, an RLF may occur between the terminal and the source base station. After the RLF occurs, the terminal may perform an operation of selecting a target base station to recover the RLF.

In this case, the terminal may have RLF information including a handover failure to be reported to the base station. In such a case, the terminal may inform the base station of this fact. Then, when necessary, the base station may receive the RLF information from the terminal and use the received RLF information to improve the handover performance. Thereafter, the base station may improve the handover performance by appropriately adjusting handover parameters in cooperation with other base stations related to the RLF information.

In addition, when the RLF recovery is successful, the terminal may report an event occurring in the RLF recovery process affecting the handover performance to the base station. Accordingly, the base station may receive information on the event that occurs in the RLF recovery process that affects the handover performance from the terminal, cooperate with other base stations related to the event, and appropriately adjust the handover parameters to further improve the handover performance. Here, the event occurring in the RLF recovery process that affects the handover performance may be referred to as an 'RLF recovery problem'. In addition, a context of the event may include a type and a content of the event.

Figure 8:
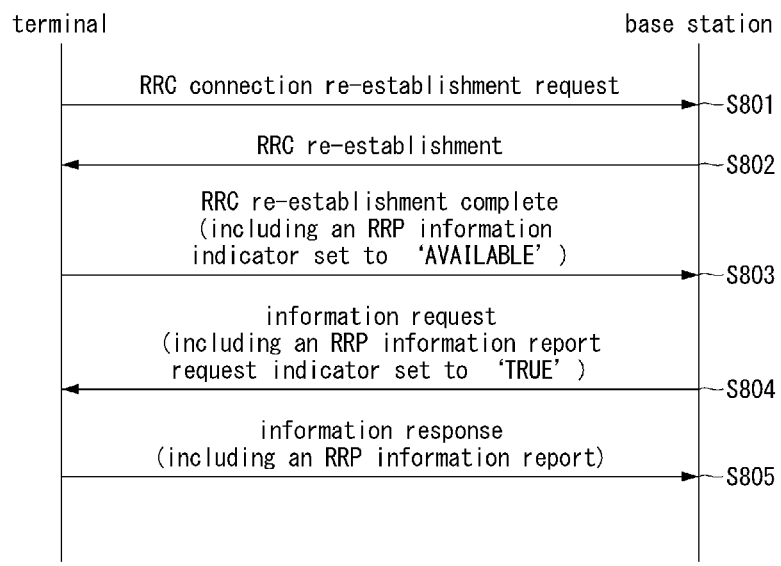
FIG. 8 is a sequence chart illustrating a first exemplary embodiment of a method for reporting an RLF recovery problem.

FIG. 8 is a sequence chart illustrating a first exemplary embodiment of a method for reporting an RLF recovery problem.

Referring to FIG. 8, in an RLF recovery problem reporting method, the terminal may transmit an RRC connection re-establishment request message to the base station (S801). Then, the base station may receive the RRC connection re-establishment request message from the terminal. In response thereto, the base station may transmit an RRC re-establishment message to the terminal (S802).

Thereafter, the terminal may transmit an RRC re-establishment complete message to the base station (S803). In this case, the terminal may have RLF recovery problem (RRP) information to be reported to the base station. In this case, the terminal may inform the base station of this fact through the RRC re-establishment complete message.

For example, the terminal may transmit the RRC re-establishment complete message to the base station by setting an RRP information indicator (e.g., rrp-Info) to 'AVAILABLE'. That is, the terminal may report occurrence of the RLF recovery problem to the base station by transmitting the RRC re-establishment complete message including the RRP information indicator set to 'AVAILABLE' to the base station. Accordingly, the base station may receive from the terminal the RRC re-establishment complete message including the RRP information indicator set to 'AVAILABLE'. That is, the base station may receive a report of the occurrence of the RLF recovery problem from the terminal.

Then, when necessary, the base station may transmit an information request message for requesting a report on RRP context information to the terminal (S804). For example, the base station may transmit an information request message to the terminal by setting an RRP information report request indicator (e.g., rrp-ReportReq) to 'TRUE'. Accordingly, the terminal may receive the information request message including the RRP information report request indicator set to 'TRUE' from the base station.

Then, the terminal may transmit an information response message including an RRP information report to the base station (S805). Accordingly, the base station may receive the information response message including the RRP information report from the terminal. Thereafter, the base station may improve the RLF recovery performance by appropriately adjusting the handover parameters in cooperation with other base stations related to the RRP information.

Figure 9:
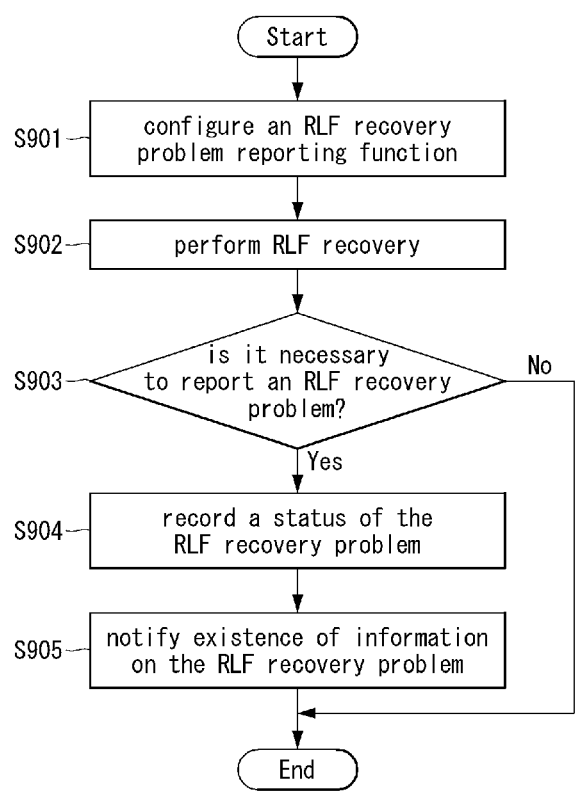
FIG. 9 is a flowchart illustrating a first exemplary embodiment of a method for recording an RLF recovery problem.

FIG. 9 is a flowchart illustrating a first exemplary embodiment of a method for recording an RLF recovery problem.

Referring to FIG. 9, in an RLF recovery problem recording method, the base station may transmit configuration information for configuring a function for reporting an RLF recovery problem occurring while performing RLF recovery to the terminal. In this case, the base station may transmit the configuration information to the terminal by using a message transmitted to the terminal in an one-to-one manner. Alternatively, the base station may transmit the configuration information to the terminal using a message broadcast to the entire system.

In this case, the configuration information may include a flag indicating whether or not it is necessary to report an RLF recovery problem when the RLF recovery problem occurs while performing the RLF recovery. For example, the flag set to '1' may indicate that it is necessary to report the RLF recovery problem. Alternatively, the flag set to '0' may indicate that it is not necessary to report the RLF recovery problem.

In addition, the configuration information may include information indicating a context of the RLF recovery problem to be reported. Here, the context may include a type and a content of the RLF recovery problem. In addition, the configuration information may include information on a specific condition for reporting occurrence of an RLF recovery problem. Here, the specific condition may be, for example, that the RLF recovery problem occurs a predetermined number of times. In this case, the predetermined number of times may be at least one or more. In this case, the specific condition may require a reference value to determine whether it is satisfied. In this case, the configuration information may include a threshold value of the reference value.

In this manner, the terminal may receive the configuration information for configuring the function for reporting an RLF recovery problem occurring while performing RLF recovery from the base station. In addition, according to the received configuration information, the terminal may configure the function for reporting an RLF recovery problem occurring while performing RLF recovery (S901).

In this manner, the terminal may configure the RLF recovery problem reporting function according to a request from the base station. Alternatively, the terminal may configure the RLF recovery problem reporting function according to predetermined configuration information without a request from the base station.

Meanwhile, the terminal may perform RLF recovery at a request of the base station or according to a determination of the terminal (S902). As such, when the terminal performs RLF recovery, an RLF recovery problem may occur. Accordingly, the terminal may determine whether it is necessary to report the RLF recovery problem that has occurred (S903). In this case, if the RLF recovery problem reporting function has been configured, the terminal may determine that it is necessary to report the RLF recovery problem. Additionally, if the terminal is configured to report the RLF recovery problem when a specific condition is satisfied, the terminal may determine whether the specific condition is satisfied and determine that it is necessary to report the RLF recovery problem when the specific condition is satisfied.

When the terminal determines that it is necessary to report the RLF recovery problem, the terminal may record a context of the RLF recovery problem (S904). The terminal may record the context of the RLF recovery problem, and may configure the recorded context information of the RLF recovery problem to be valid. Thereafter, the terminal may notify the base station of the existence of the context information of the RLF recovery problem (S905). That is, the terminal may report the occurrence of the RLF recovery problem to the base station. In this case, the terminal may inform the target cell of the existence of the context information of the RLF recovery problem using an RLF recovery complete message.

Alternatively, after transmitting the RLF recovery complete message, the terminal may use another message to inform the base station of the existence of the context information of the RLF recovery problem. On the other hand, the base station may transmit an information request message requesting a report of the context information of the RLF recovery problem to the terminal when necessary.

Accordingly, the terminal may receive an information request message including a report request on the context information of the RLF recovery problem from the base station. Thereafter, the terminal may transmit an information response message including the context information of the RLF recovery problem to the base station. Accordingly, the base station may receive the information response message including the context information of the RLF recovery problem from the terminal. In this case, the terminal may configure the context information of the RLF recovery problem to be invalid after transmitting the context information of the RLF recovery problem to the base station. Alternatively, the terminal may configure the context information of the RLF recovery problem to be invalid any longer before a next RLF recovery is performed.

Meanwhile, the context information of the RLF recovery problem may include the type and content of the RLF recovery problem. Here, the type of RLF recovery problem may indicate the type of recorded RLF recovery problem. The RLF recovery problem affecting RLF recovery performance may be, for example, an RLF recovery interruption time. Here, the RLF recovery interruption time may mean a time from the time when the terminal last receives data from the source cell to the time when the terminal first receives data from the target cell after performing the handover.

Only when the RLF recovery interruption time is greater than a specific threshold, the terminal may report it to the base station. As a method of reporting the RLF recovery interruption time problem, the terminal may report only whether the RLF recovery interruption time problem occurs to the base station. Alternatively, the terminal may report to the base station information on the RLF recovery interruption time in addition to whether the RLF recovery interruption time problem occurs.

Alternatively, the terminal may measure the RLF recovery interruption time by dividing the RLF recovery interruption time into an interruption time in the source cell and an interruption time in the target cell, and report them to the base station. The terminal may measure the RLF recovery interruption time for each detailed step and report it to the base station. For example, the terminal may measure the interruption time for each step by applying Table 2 below and report it to the base station.

TABLE 2

| Type | Usual values and descriptions |
|---|---|
| RLF timer | 1000 ms |
| Re-establishment delay at a terminal | 50 ms + $N_{freq}*T_{search} + T_{SI} + T_{PRACH}$<br>$T_{search}$: 100 ms (for a known cell), 800 ms (for a unknown cell)<br>$N_{freq}$: The total number of frequencies to be monitored<br>$T_{SI}$: A time required for receiving the entire corresponding system information according to a reception procedure<br>$T_{PRACH}$: Additional delay caused by a random access procedure |
| RRC reconfigure procedure delay | 40 ms |
| Non access stratum (NAS) recovery delay | 200 ms |

Meanwhile, the target base station may transmit the context information of the RLF recovery problem to the source base station through an RLF recovery problem report message. Here, the context information of the RLF recovery problem may include the type and content of the RLF recovery problem received by the target base station from the terminal. Then, the source base station may receive the RLF recovery problem report message including the context information of the RLF recovery problem from the target base station. Here, it has been expressed that the target base station transmits the context information of the RLF recovery problem only to the source base station, but is not limited thereto, and may transmit it to other related base stations.

The source base station may update an RLF recovery algorithm and RLF recovery parameters to optimize the RLF recovery performance based on the context information of the RLF recovery problem received from the target base station.

The source base station may improve the RLF recovery performance by configuring improved RLF recovery parameters to other terminals accessing the source base station. In addition, the source base station may transmit updated system configuration information to the target base station so that the updated system configuration information is reflected to system configuration information of the target base station. To this end, the source base station may transmit a configuration update message including the updated system configuration information to the target base station.

Then, the target base station may receive a configuration update message including the updated system configuration information from the source base station. The target base station may update its system configured information by reflecting the received updated system configuration information. In addition, the target base station may transmit a configuration update response message to the source base station in response to the configuration information update message. Then, the source base station may receive the configuration update response message from the target base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
    receiving a problematic handover-related reporting condition from a source cell;
    performing a handover from the source cell to a target cell;
    in response to the handover being successful and the problematic handover-related reporting condition being satisfied, storing first information related to the handover; and
    transmitting, to the target cell, second information indicating the first information related to the handover is stored.

2. The operation method according to claim 1, wherein the first information related to the handover includes information on a handover problem affecting performance of the successful handover.

3. The operation method according to claim 2, wherein the first information related to the handover includes information related to an outage time during the handover.

4. The operation method according to claim 2, wherein the first information related to the handover includes information related to an interruption time of the handover.

5. The operation method according to claim 1, wherein the problematic handover-related reporting condition is received from the source cell through a radio resource control (RRC) reconfiguration message.

6. The operation method according to claim 1, wherein the second information corresponds to a handover problem indicator included in an RRC reconfiguration complete message transmitted to the target cell, and the handover problem indicator is set to a value indicating that first information related to the handover is available.

7. The operation method according to claim 1, further comprising:
   receiving a transmission request for a content report of the first information related to the handover from the target cell; and
   transmitting the content report to the target cell.

\* \* \* \* \*